UNITED STATES PATENT OFFICE.

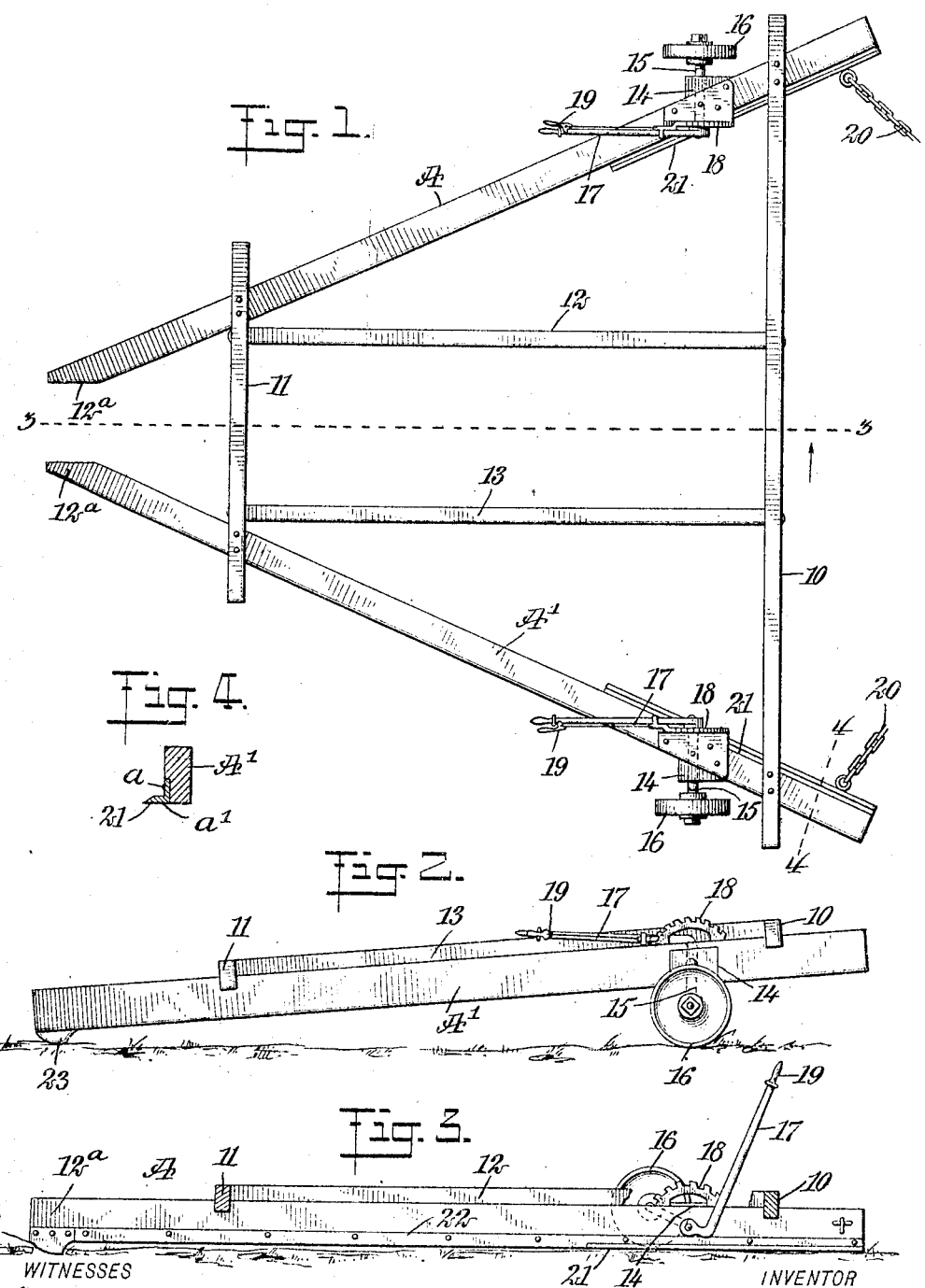

EDWARD JAMES MILLS, OF WEBB, IOWA.

ROAD-DRAG.

No. 916,179.　　　Specification of Letters Patent.　　Patented March 23, 1909.

Application filed August 18, 1908.　Serial No. 449,034.

*To all whom it may concern:*

Be it known that I, EDWARD J. MILLS, a citizen of the United States, and a resident of Webb, in the county of Clay and State of Iowa, have invented new and useful Improvements in Road-Drags, of which the following is a full, clear, and exact description.

The purpose of the invention is to provide a simple, durable and economic machine of light draft that will effectively gather the earth from the sides of the road and distribute it at and in the direction of the crown or center of the road, thus building the road up in the most approved manner.

It is a further purpose of the invention to provide means for insuring a straight draft and means for lifting the forward ends of the machine so that it may pass obstructions and readily cross bridges, culverts and the like.

The invention consists in a V-shaped frame adapted to drag at its divergent ends or to be wheel-supported at such points, and to so construct the frame that steering or directing members will be provided at its converging ends whereby to insure the device preserving a predetermined path.

In the drawings that serve to illustrate my invention, I have illustrated the preferred form of the device, but I desire it to be understood that the construction of the frame may be changed and likewise the means for raising and lowering the forward portion of the frame without departing from the spirit of the invention.

In the drawings, Figure 1 is a plan view of the drag; Fig. 2 is a side elevation thereof; Fig. 3 is a longitudinal vertical section taken practically on the line 3—3 of Fig. 1, and Fig. 4 is a transverse detail section taken essentially on the line 4—4 of Fig. 1.

Like characters of reference designate corresponding parts in all the views.

In the construction of the frame of the device, two divergent side pieces A and A' are employed, that converge at their rear ends and diverge at their forward ends. These side beams or pieces are connected at the front by a cross bar 10 and at the rear by a cross bar 11 secured in any suitable manner to the beams A and A', and the construction of the frame is completed by the addition of intermediate longitudinal bars 12 and 13 that extend from one cross bar 10 to the other 11 and are made fast thereto, as is particularly shown in Fig. 1.

Boxes 14 are carried by the side beams A and A' adjacent to their forward ends, and in these boxes, crank axles 15 are mounted. Wheels 16 are loosely carried at the outer ends of the axles; and at the inner ends of each axle a lever 17 is secured, whereby to raise and lower the forward end of the device to elevate it when passing obstructions and to lower the frame to bring the cutters or scrapers into action when the obstructions to operation have been passed. The wheels in service promote the passage of the device to and from the field of action, and can be held in adjusted position by thumb latches 19 in the levers 17, that engage with racks 18 on the side beams A and A'.

Any known means may be employed for adjusting the throw of the axles 15 to make the scrapers cut more or less deeply.

The draft chains 20, or their equivalents, are attached to the forward end portions of the side beams A and A', as are the cutters or scrapers 21, shown best in Fig. 4. These cutters or scrapers 21 are secured to the lower inside edges of the beams A and A' at their forward portions, as shown in Figs. 1 and 3, and extend from the front ends of the beams A and A' to a point at or near their centers. These scrapers consist of a longitudinal vertical member a that extends from one end of a beam to the other at its inner side, and a horizontal cutting or scraping blade a' that extends inward at right angles to the member a and which terminates at the point above mentioned.

The member a of the cutter or scraper beyond the blade a', follows the inner, lower edge portion of a side beam and is attached thereto, which continuation is designated as 22 in the drawings and may be carried beneath the lower edge of the beam to which it is applied.

The inner faces 12ᵃ at the rear ends of the side beams A and A' are inclined as is shown in Fig. 1, and at such points guide teeth or blades 23 are secured, which may, if desired, be portions of the protective strips 22. These teeth or blades entering the ground, serve to keep the device in operation in a straight or direct line, preventing the device from shifting laterally.

A device of the character described is not only simple, but it will effectively and quickly scrape and crown a road bed, and can be safely conducted over obstructions and quickly placed in operation when the obstructions are passed.

Having thus described my invention, I claim as new and desire to secure by Letters Patent:

1. In a road drag, a substantially triangular-shaped frame, and scrapers or cutting blades at the forward portions of the frame, the scraping blades consisting of longitudinal vertical members secured to the inner faces of the side members of the frame, and horizontal cutting or scraping members extending inward from the said vertical members and at right angles thereto, and guide devices adapted to enter the ground at the rear end portion of the frame.

2. In a road drag, a substantially triangular-shaped frame having connected side members diverging at their forward ends, and scrapers at the forward portions of the side members, the said scrapers consisting of longitudinal vertical members secured to the inner faces of said side members of the frame, and horizontal cutting members extending inward from the lower edges of said vertical members and at right angles thereto.

3. In a road drag, a substantially triangular-shaped frame having side pieces diverging at their forward ends, and scrapers comprising horizontal cutting members extending inward from the lower edge of said side members at the forward portions thereof.

4. In a road drag, scraper blades at the forward end portions of the drag at opposite sides thereof, the said blades each comprising an inwardly extending horizontally arranged cutting member, and guide devices adapted to enter the ground at the rear end portion of the drag.

5. In a road drag, the combination with a substantially triangular-shaped frame, the side pieces whereof are separated at their rear converging ends and having their inner faces beveled at said ends, of scrapers consisting of longitudinal vertical members secured to the inner faces of said side members of the frame and extending from the front end of the side members to the rear thereof and horizontal cutting or scraping members extending inward from the forward portion of said vertical members and at right angles thereto, and guide blades at the rear ends of said longitudinal vertical members of the scrapers and adapted to enter the ground, the said guide blades being secured to the beveled inner faces at the rear ends of said side pieces.

6. In a road drag, the combination with a substantially triangular-shaped frame, the side pieces whereof are separated at their rear converging ends and having their inner faces beveled at said ends, of scrapers secured to the inner faces of the side pieces of the frame and consisting of longitudinal vertical strips extending from the front end of the side members to the rear thereof and horizontal cutting members, extending inward from the forward end portion of said vertical members, guide blades at the rear ends of said longitudinal strips and secured to the beveled inner faces at the rear ends of the side pieces, means for raising and lowering the forward portion of the frames, and draft means secured to the forward portion of the frame.

In testimony whereof I have signed my name to this specification in the presence of two subscribing witnesses.

EDWARD JAMES MILLS.

Witnesses:
W. T. NEY,
PETERS TALAN.